United States Patent
Zou et al.

(10) Patent No.: US 10,646,786 B1
(45) Date of Patent: May 12, 2020

(54) SWINGING DRIVE CONTROL APPARATUS AND METHOD

(71) Applicants: KUNSHAN LUCKY CHILD PRODUCT CO., LTD., Suzhou, Jiangsu (CN); Xuan Zhu, Zhongshan, Guangdong (CN)

(72) Inventors: Xueming Zou, Jiangsu (CN); Xuan Zhu, Guangdong (CN)

(73) Assignees: KUNSHAN LUCKY CHILD PRODUCT CO., LTD. (CN); Xuan Zhu (CN)

(*) Notice: Subject to any disclaimer, the term of this patent is extended or adjusted under 35 U.S.C. 154(b) by 0 days.

(21) Appl. No.: 16/278,700

(22) Filed: Feb. 18, 2019

(30) Foreign Application Priority Data

Oct. 30, 2018 (CN) .......................... 2018 1 1273088

(51) Int. Cl.
  *A63G 9/16*  (2006.01)
  *H02P 7/29*  (2016.01)
  *A47C 3/025*  (2006.01)
  *A47D 13/10*  (2006.01)
  *A47C 3/00*  (2006.01)

(52) U.S. Cl.
  CPC .............. *A63G 9/16* (2013.01); *A47C 3/0251* (2018.08); *A47C 3/0255* (2013.01); *A47D 13/105* (2013.01); *H02P 7/29* (2013.01)

(58) Field of Classification Search
  CPC ... A63G 9/00; A63G 9/16; G05D 3/00; G05B 15/02
  USPC ................................ 472/118–125; 297/217.3
  See application file for complete search history.

(56) References Cited

U.S. PATENT DOCUMENTS

| | | | | |
|---|---|---|---|---|
| 3,792,328 A | * | 2/1974 | Woloszyk | A61G 5/042 318/139 |
| 2008/0255734 A1 | * | 10/2008 | Altshuller | B60N 2/0244 701/49 |
| 2014/0084553 A1 | * | 3/2014 | Carletti | A61G 5/061 280/5.22 |
| 2015/0019020 A1 | * | 1/2015 | Hille | A47C 20/041 700/275 |

* cited by examiner

*Primary Examiner* — Kien T Nguyen

(57) ABSTRACT

Disclosed is a swinging drive control apparatus, including a controller and a motor, where the controller detects a counter-electromotive force of the motor and drives the motor according to the detection result. Also disclosed is a corresponding method, including: measuring a counter-electromotive force of a motor in a previous cycle; and comparing a maximum counter-electromotive force value with a preset value, and calculating a PWM pulse duty factor in a next cycle. By directly detecting the counter-electromotive force of the motor without using a sensor, the present invention implements swinging frequency and phase tracking as well as swinging amplitude control, and simplifies a control system.

12 Claims, 9 Drawing Sheets

US 10,646,786 B1

SWINGING DRIVE CONTROL APPARATUS AND METHOD

FIELD

The present invention relates to a swinging drive control apparatus and method, and in particular, to a swinging drive control apparatus and method for swings and rocking chairs or glider chairs, and belongs to the field of swinging control.

BACKGROUND

The existing automatic swings and rocking chairs or glider chairs generally use motors to drive swinging objects to swing, and swinging resonance controllers all need special sensors to implement swinging frequency and phase tracking as well as swinging amplitude control, and therefore, the costs are high.

SUMMARY

In order to solve the technical problems above, the present invention provides swinging drive control apparatuses and methods, which do not use a sensor to implement swinging frequency and phase tracking as well as swinging amplitude control.

To achieve the purpose above, the present invention adopts the following technical solution: a swinging drive control apparatus, including a controller and a motor, where the controller detects a counter-electromotive force of the motor and drives the motor according to the detection result.

In a swinging cycle of a swinging object, the first half cycle is the time when the controller drives the motor to push the swinging object to swing, and the second half cycle is the time when the controller detects the counter-electromotive force of the motor.

The controller controls the time for driving the motor in a next cycle according to start time and end time of the counter-electromotive force of the motor in a previous cycle, so as to implement swinging frequency and phase tracking of the swinging object.

The controller controls a PWM (Pulse Width Modulation) pulse duty factor in the next cycle according to a maximum counter-electromotive force value of the motor in the previous cycle, so as to implement swinging amplitude control of the swinging object.

A swing includes the swinging drive control apparatus.

A rocking chair or a glider chair includes the swinging drive control apparatus.

A swinging drive control method includes the following steps: detecting a counter-electromotive force of a motor in a previous cycle; and comparing a maximum counter-electromotive force value with a preset value, and calculating a PWM pulse duty factor in a next cycle.

The method further includes controlling the time for driving the motor in the next cycle according to start time and end time of the counter-electromotive force of the motor in the previous cycle.

The method for calculating the time for driving the motor in the next cycle is: calculating an intermediate point of a duration of the counter-electromotive force in the previous cycle, $t1=(t_0+t_j)/2$, $t_0$ and $t_j$ being the start time and the end time of the counter-electromotive force in the previous cycle respectively; calculating an intermediate point of a duration for driving the motor in the next cycle, $t2=t1+T/2$, T being an intrinsic swinging cycle of swinging of a swinging object; and calculating a start point of the time for driving the motor in the next cycle, $t=t2-T_1/2$, $T_1$ being a preset duration for driving the motor.

T1 is less than T/2, and in a process from a highest point to a lowest point, t is later than the time for arriving at the highest point and is earlier than the time for arriving at the lowest point.

The beneficial effects achieved by the present invention are that: by directly detecting a counter-electromotive force of a motor without using a sensor, the present invention implements swinging frequency and phase tracking as well as swinging amplitude control, and simplifies a control system.

DETAILED DESCRIPTION

The present invention is further descried below in combination with the accompanying drawings. The following embodiments are merely used for more clearly describing the technical solutions of the present invention, but are not intended to limit the scope of protection of the present invention.

Figure 1:
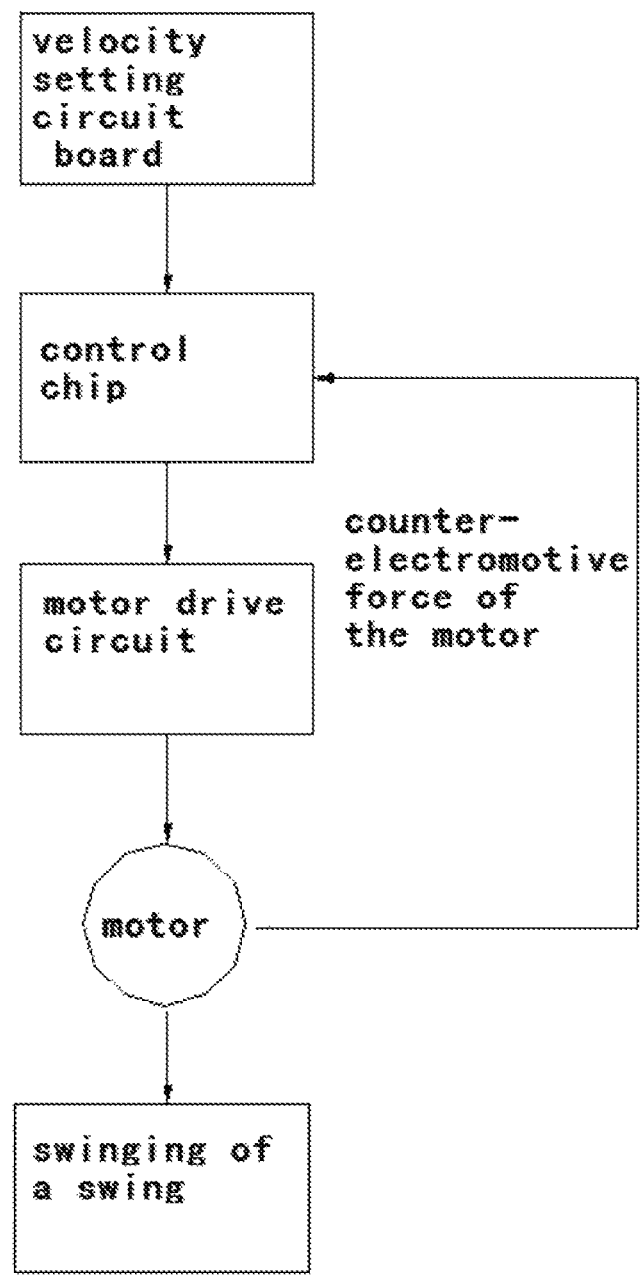
FIG. 1 is a structural block diagram of an apparatus of the present invention.

As shown in FIG. 1, a swinging drive control apparatus includes a controller 1 and a motor 2.

The controller 1 is electrically connected to the motor 2, and the main functions of the controller 1 are as follows:

1. Outputting A PWM pulse to the motor 2.

2. Detecting a counter-electromotive force of the motor 2 in a previous cycle and driving the motor 2 according to the detection result.

In a swinging cycle of a swinging object, the first half cycle is the time when the controller 1 drives the motor 2 to push the swinging object to swing, and the second half cycle is the time when the controller 1 detects the counter-electromotive force of the motor 2. The controller 1 controls a PWM pulse duty factor in a next cycle according to a maximum counter-electromotive force value of the motor 2 in the previous cycle, so as to implement swinging amplitude control of the swinging object; specifically, the maximum counter-electromotive force value is compared with a preset value, the PWM pulse duty factor in the next cycle is calculated using a Proportional-Derivative (PD) algorithm, and the controller 1 controls the motor 2 using a PWM method.

3. The controller 1 controls the time for driving the motor 2 in the next cycle according to start time and end time of the counter-electromotive force of the motor 2 in the previous cycle, so as to implement swinging frequency and phase tracking of the swinging object.

The motor 2 is connected to the swinging object 4 by means of a deceleration system and outputs a swinging driving force according to the received PWM pulse.

Figure 2:
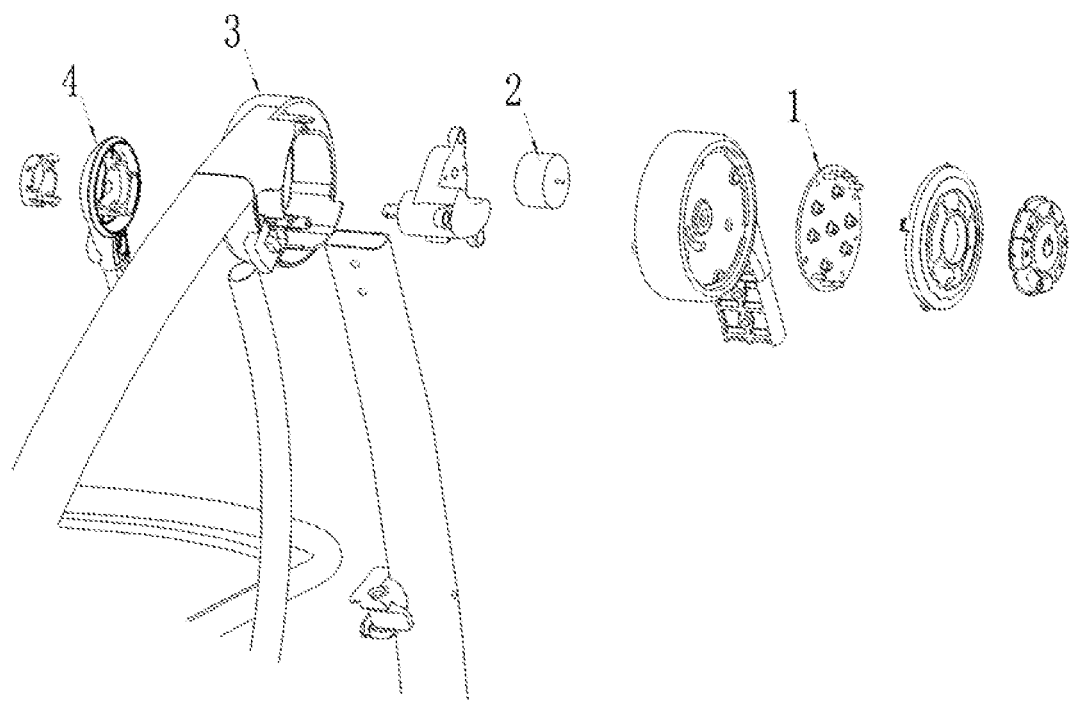
FIG. 2 is a schematic structural diagram of the apparatus of the present invention.

The structure of the swinging drive control apparatus may be as illustrated in FIG. 2. A circuit board of the controller 1 is fixed inside a box body 3; a set port of the controller 1 may be provided at a surface of the box body 3; the controller 1 is connected to a power supply; the rear end of the motor 2 is also fixed inside the box body 3; the front end (i.e., a rotary shaft end) of the motor 2 extends out of the box body 3; the front end of the motor 2 is connected to an end portion of the swinging object 4; and the swinging object 4 is driven to swing by rotation of the motor 2.

Figure 3:
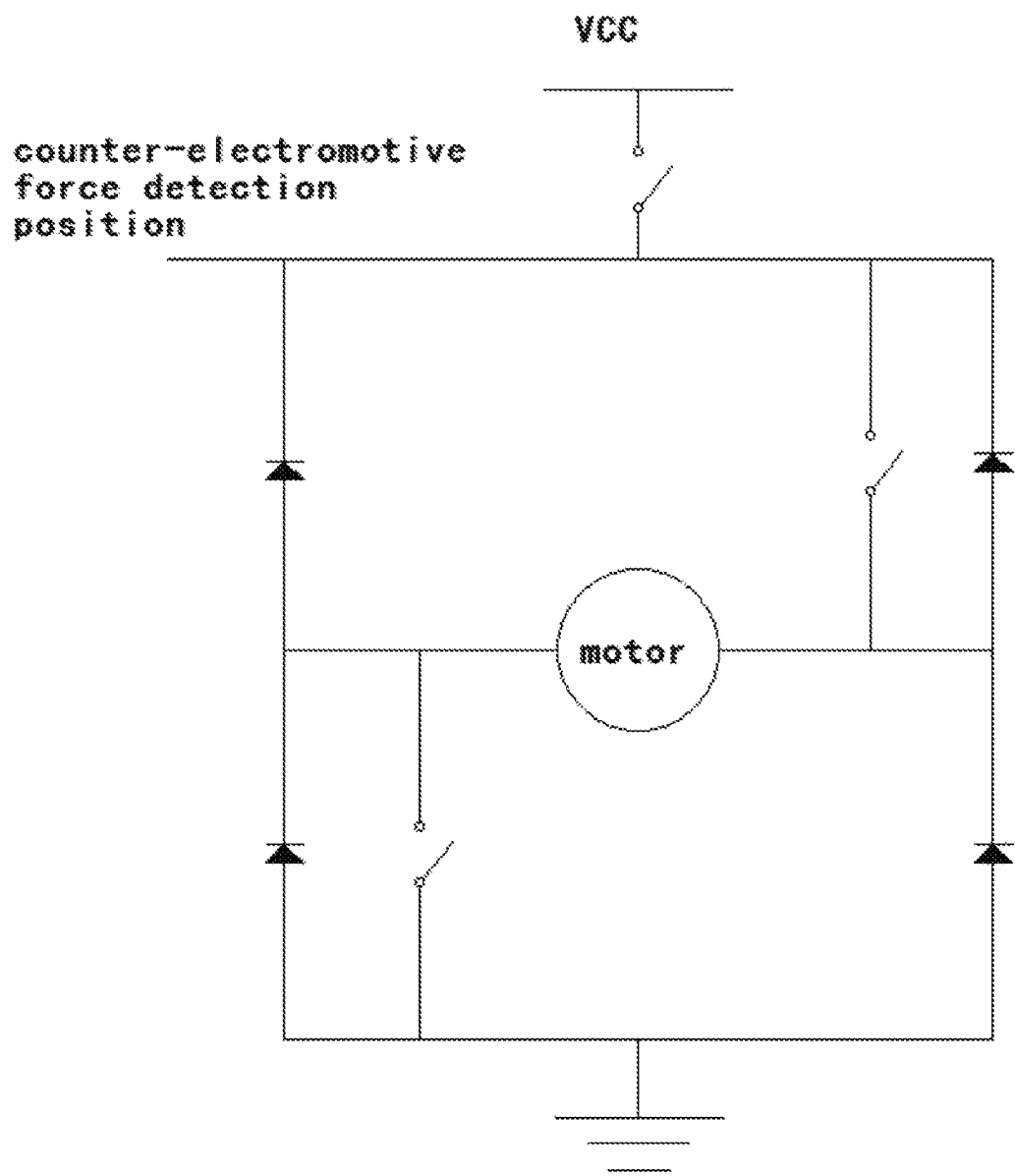
FIG. 3 is a circuit diagram for motor drive and counter-electromotive force detection.
Figure 4:
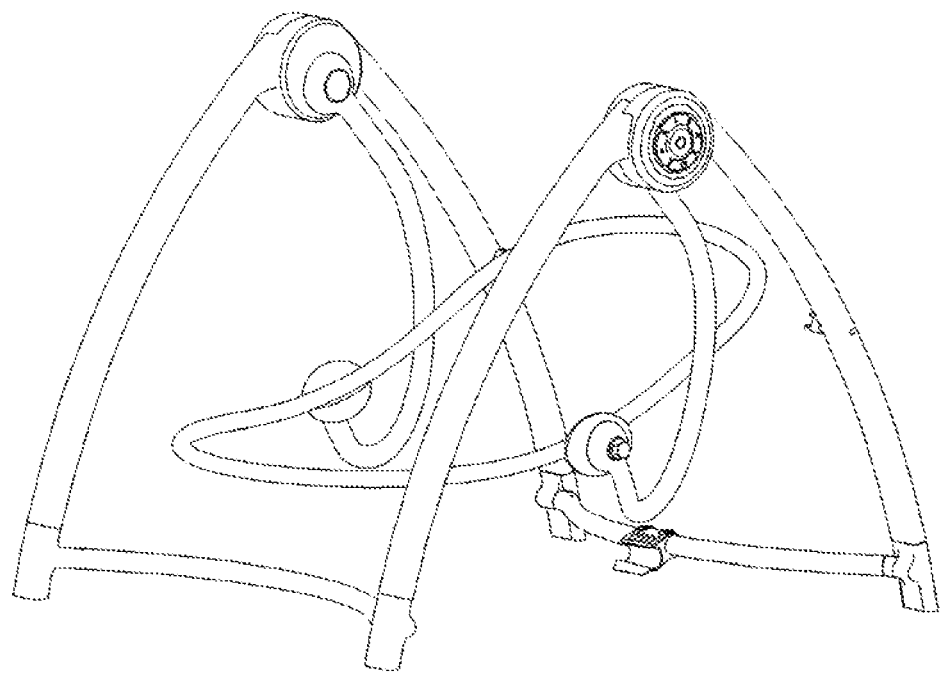
FIG. 4 illustrates an embodiment of the present invention in a baby swing.
Figure 5:
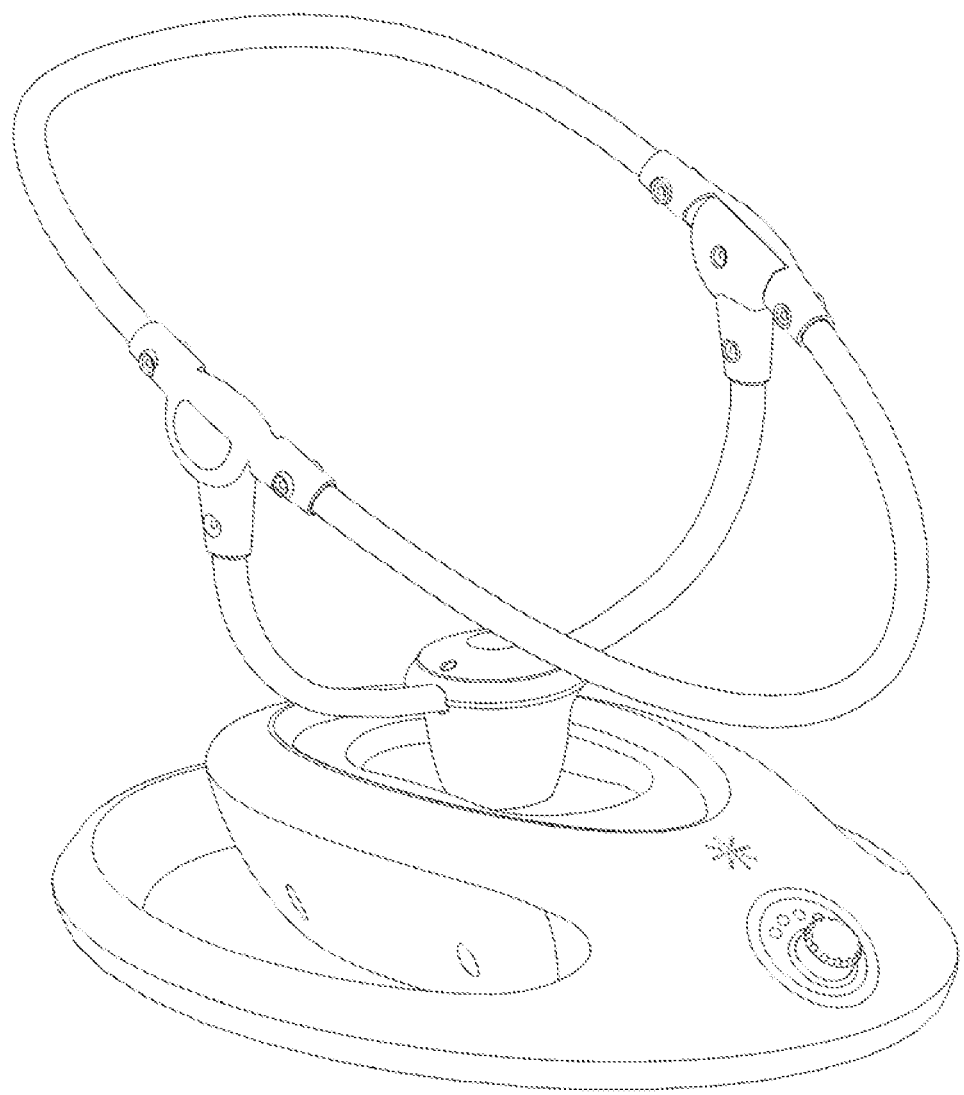
FIG. 5 illustrates an embodiment of the present invention in a baby rocking chair.
Figure 6:
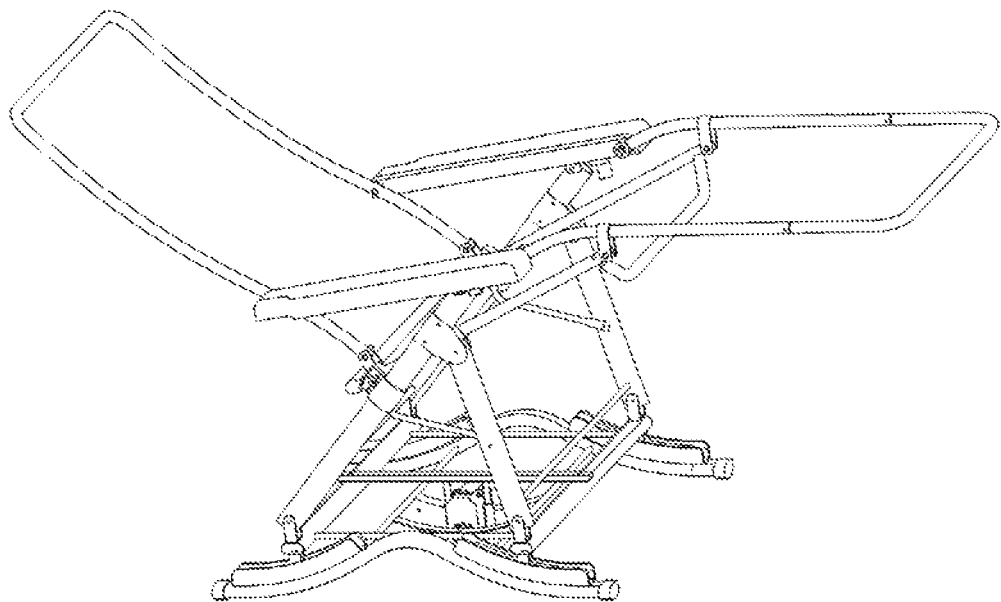
FIG. 6 illustrates an embodiment of the present invention in an adult rocking chair.
Figure 7:
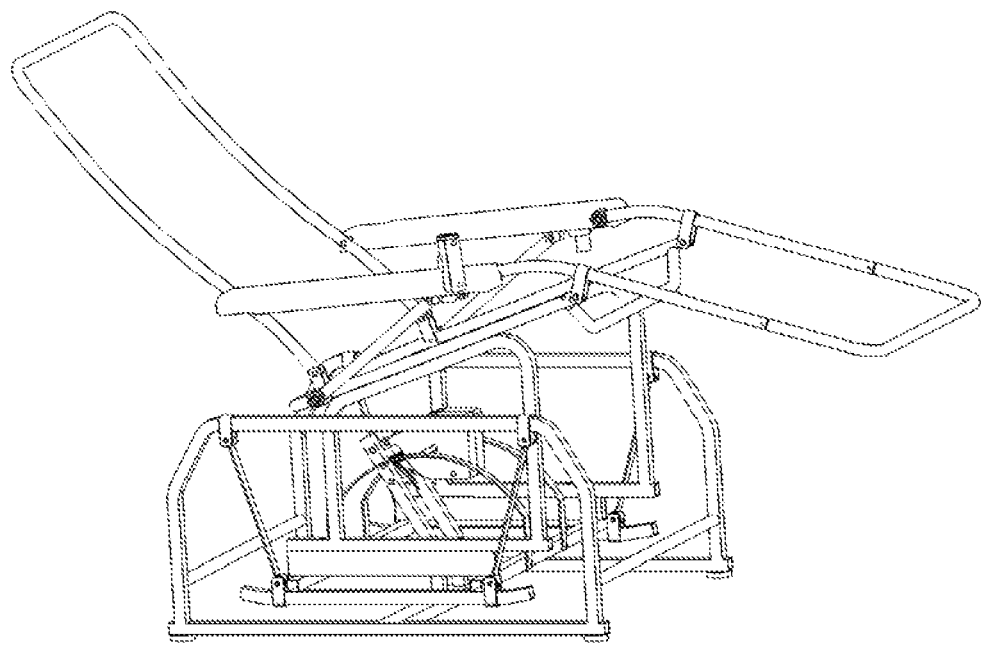
FIG. 7 illustrates an embodiment of the present invention in an adult rocking chair.
Figure 8:
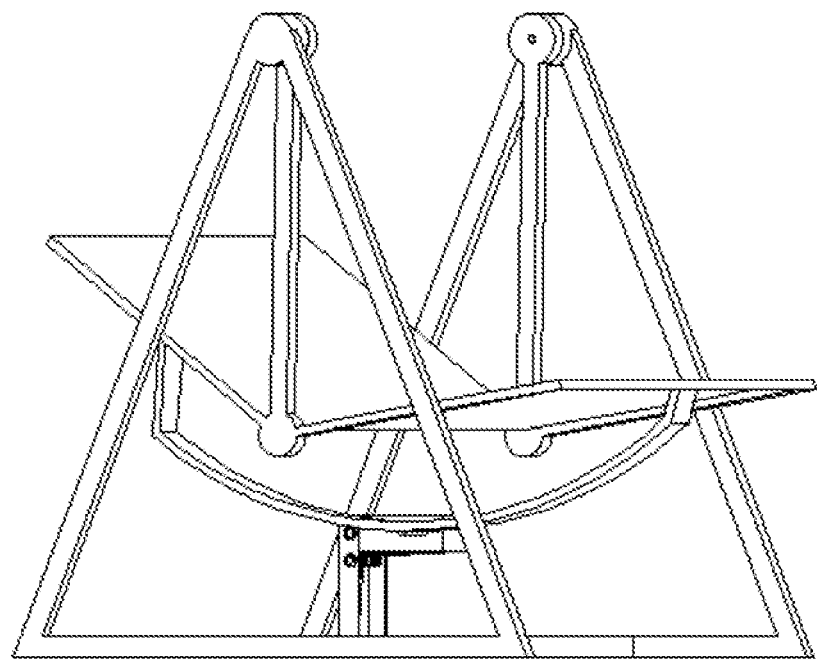
FIG. 8 illustrates an embodiment of the present invention in an adult swing.

Three switches in FIG. 3 are used for implementing PWM pulse control. When the three switches are closed, the motor 2 is connected to the power supply, entering a PWM pulse high level time; when the three switches are open, the motor 2 is disconnected from the power supply, entering a PWM pulse low level time. When the counter-electromotive force is measured, the three switches are also open, and the counter-electromotive force of the motor 2 is not affected by the power supply.

Nowadays, common swinging objects are swings and rocking chairs or glider chairs, and the aforementioned swinging drive control apparatus may be directly applied to swings and rocking chairs or glider chairs. Please refer to FIGS. 5-8 for details.

Figure 9:
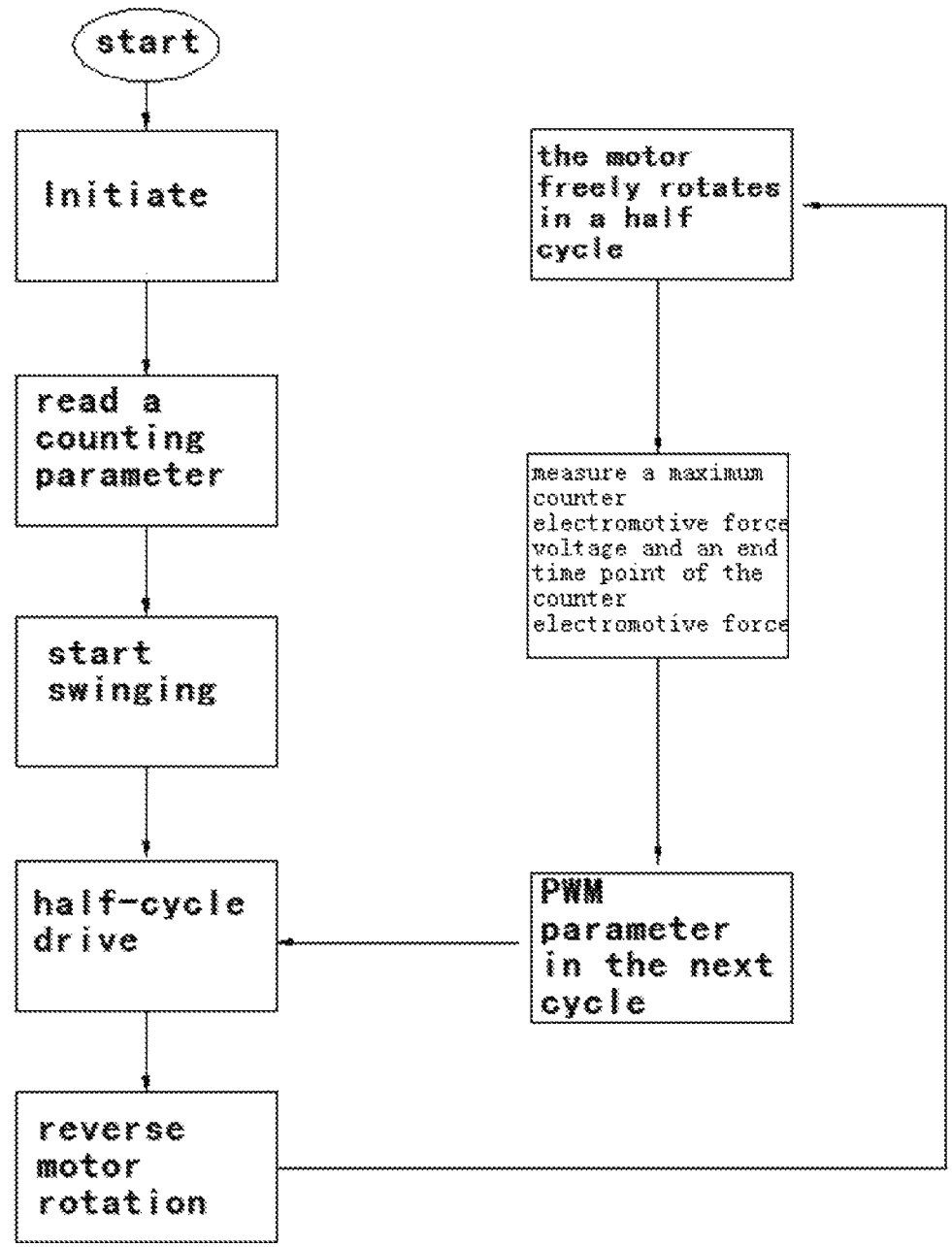
FIG. 9 is a flow chart of a method of the present invention.

As shown in FIG. 9, a swinging drive control method is specifically as below:

A) detecting a counter-electromotive force of a motor 2 in a previous cycle;

B) comparing a maximum counter-electromotive force value with a preset value, and calculating a PWM pulse duty factor in a next cycle; and C) controlling the time for driving the motor 2 in the next cycle according to start time and end time of the counter-electromotive force of the motor 2 in the previous cycle.

The process for calculating the time for driving the motor 2 in the next cycle is as follows:

c1) presetting a measured intrinsic swinging cycle T of swinging of a swinging object;

c2) calculating an intermediate point of a duration of the counter-electromotive force in the previous cycle, $t1=(t_0+t_j)/2$, $t_0$ and $t_j$ respectively being the start time and the end time of the counter-electromotive force in the previous cycle;

c3) calculating an intermediate point of a duration for driving the motor 2 in the next cycle, $t2=t1+T/2$;

c4) calculating a start point of the time for driving the motor 2 in the next cycle, $t=t2-T_1/2$, T1 being a preset control signal duration, $T_1$ being less than T/2, and in a process from a highest point to a lowest point, t being later than the time for arriving at the highest point and being earlier than the time for arriving at the lowest point.

By directly detecting a counter-electromotive force of a motor 2 without using a sensor, the present invention implements swinging frequency and phase tracking as well as swinging amplitude control, and simplifies a control system, thereby enabling swinging of the swinging object to resonate with driving of the motor 2, so as to achieve comfort and labor saving in swinging.

The above are only preferred embodiments of the present invention. It should be noted that many modifications and variations can be made thereto for a person skilled in the art without departing from the technical principle of the present invention, and those modifications and variations should also be regarded as falling within the scope of protection of the present invention.

What is claimed is:

1. A swinging drive control apparatus, comprising a controller and a motor, wherein,
    the controller detects a counter-electromotive force of the motor and drives the motor according to the detected result, wherein,
    the controller calculates a PWM (Pulse Width Modulation) pulse duty factor in a next cycle by comparing a maximum counter-electromotive force value of the motor in a previous cycle with a preset value, so as to control the motor using a PWM method.

2. The swinging drive control apparatus according to claim 1, wherein,
    in a swinging cycle of a swinging object, the first half cycle is a time when the controller drives the motor to push the swinging object to swing, and the second half cycle is a time when the controller detects the counter-electromotive force of the motor.

3. The swinging drive control apparatus according to claim 1, wherein,
    the controller controls a time for driving the motor in a next cycle according to start time and end time of the counter-electromotive force of the motor in a previous cycle, so as to implement swinging frequency and phase tracking of a swinging object.

4. A swing, comprising a swinging drive control apparatus according to claim 1.

5. The swing according to claim 4, wherein,
    in a swinging cycle of a swinging object, the first half cycle is a time when the controller drives the motor to push the swinging object to swing, and the second half cycle is a time when the controller detects the counter-electromotive force of the motor.

6. The swing according to claim 4, wherein,
    the controller controls a time for driving the motor in a next cycle according to start time and end time of the counter-electromotive force of the motor in a previous cycle, so as to implement swinging frequency and phase tracking of a swinging object.

7. The swing according to claim 4, wherein,
    the controller controls a PWM pulse duty factor in a next cycle according to a maximum counter-electromotive force value of the motor in a previous cycle, so as to implement swinging amplitude control of a swinging object.

8. The swing according to claim 4, wherein,
    the swing is a rocking chair or a glider chair.

9. A swinging drive control method, comprising the following steps:
    detecting a counter-electromotive force of a motor in a previous cycle; and
    comparing a maximum counter-electromotive force value with a preset value, and calculating a PWM (Pulse Width Modulation) pulse duty factor in a next cycle, and
    controlling the motor using a PWM method.

10. The swinging drive control method according to claim 9, further comprising
    controlling a time for driving the motor in the next cycle according to start time and end time of the counter-electromotive force of the motor in the previous cycle.

11. The swinging drive control method according to claim 10, wherein, the step for calculating the time for driving the motor in the next cycle comprises:

calculating an intermediate point of a duration of the counter-electromotive force in the previous cycle, $t1=(t_0+t_j)/2$, $t_0$ and $t_j$ being the start time and the end time of the counter-electromotive force in the previous cycle respectively;

calculating an intermediate point of a duration for driving the motor in the next cycle, $t2=t1+T/2$, T being an intrinsic swinging cycle of swinging of a swinging object; and calculating a start point of the time for driving the motor in the next cycle, $t=t2-T_1/2$, $T_1$ being a preset duration for driving the motor.

12. The swinging drive control method according to claim 11, wherein, $T_1$ is less than T/2, and in a process from a highest point to a lowest point, t is later than a time for arriving at the highest point and is earlier than a time for arriving at the lowest point.

* * * * *